United States Patent [19]

Yoon et al.

[11] Patent Number: 5,212,971
[45] Date of Patent: May 25, 1993

[54] FUEL TANK PLUG STRUCTURE

[75] Inventors: Kuk S. Yoon, Seoul, Rep. of Korea; Chi K. Chang, Houston, Tex.

[73] Assignee: Kuk Sun Yoon, Seoul, Rep. of Korea

[21] Appl. No.: 818,035

[22] Filed: Jan. 8, 1992

[30] Foreign Application Priority Data

Jan. 8, 1991 [KR] Rep. of Korea .................. 91-152[U]
Jan. 23, 1991 [KR] Rep. of Korea .................. 91-918[U]

[51] Int. Cl.⁵ .......................................... B65D 55/14
[52] U.S. Cl. ...................... 70/165; 70/171; 70/288; 220/210
[58] Field of Search .............. 70/63, 220, 288, 312, 70/163-173, 174, 175; 220/202, 203, 210, 288, 303

[56] References Cited

U.S. PATENT DOCUMENTS

| | | | |
|---|---|---|---|
| 1,908,593 | 5/1933 | Fortune | 70/165 |
| 3,979,932 | 9/1976 | Piche | 70/63 |
| 3,998,078 | 12/1976 | Detwiler | 70/171 |
| 4,132,091 | 1/1979 | Aro et al. | 70/165 |
| 4,296,617 | 10/1981 | Campagna | 70/63 |
| 4,342,208 | 8/1982 | Evans | 70/165 |
| 4,794,768 | 1/1989 | Moser et al. | 70/165 |
| 4,829,796 | 5/1989 | Kim | 70/168 |
| 5,060,491 | 10/1991 | Smith | 70/63 |

FOREIGN PATENT DOCUMENTS

| | | | |
|---|---|---|---|
| 2904777 | 8/1979 | Fed. Rep. of Germany | 70/165 |
| 1336736 | 11/1973 | United Kingdom | 70/163 |

Primary Examiner—Peter M. Cuomo
Assistant Examiner—Suzanne L. Dino
Attorney, Agent, or Firm—Bacon & Thomas

[57] ABSTRACT

A fuel tank plug structure has a cap assembly provided with a cap member and a push button combination lock, a fixing plate including a lever for cooperating with the push button combination lock, an intermediate portion below the fixing plate defining a interior storage compartment adapted to contain articles such as keys, money, etc., a clogging assembly provided with a tubular portion including a lower engaging portion configured to be removably, received on, so as to close, a container or vehicle fuel tank filler neck and a supporting member causing the intermediate portion to be engaged with the tubular portion through a sealing member. The push button combination lock has a slider which will engage the fixing plate with the intermediate portion upon depressing a correct series of buttons and will disengage the cap member from the intermediate portion when the correct series of buttons are not depressed. Therefore, when the cap member is disengaged with the intermediate portion, it rotates freely to prevent removal of the fuel tank plug structure from the container and access to the hidden article and to the container contents. On the contrary, when the cap member is engaged, the whole fuel tank plug structure can be rotated as a single unit allowing the cap assembly to be installed or removed from the container or fuel tank filler neck to gain access to the container and to the storage compartment of the fuel tank plug structure.

7 Claims, 3 Drawing Sheets

FUEL TANK PLUG STRUCTURE

BACKGROUND OF THE INVENTION

1. Field of the Invention

This invention relates generally to lockable plugs, and more particularly to a plug structure for closing a fuel tank or a container and which has an interior compartment for storing articles along with a combination lock for selectively releasing the plug structure.

2. Brief Description of the Prior Art

Locking fuel tank caps are known in the art. Most locking fuel tank caps are operated only by their corresponding key in a manner which the cap closes off the open end of the fuel tank filler neck. These types of caps are popular for closing the filler neck of an automobile fuel tank to prevent theft of the fuel. But, they have no provision for a storage compartment for their key.

In addition, magnetic boxes for containing an extra set of keys are known which can be magnetically attached to vehicles in a hidden location, but they are easily detached by unauthorized person, and often fall off while driving.

U.S. Pat. No. 4,794,768 issued to Moser et al discloses a gas cap having a push button combination lock, but does not suggest a storage compartment in the cap.

U.S. Pat. No. 4,829,796 issued to Mr. Kim discloses a locking gas cap assembly which utilizes a rotating ring type of lock of the type often used on brief cases. The cap member is a ring shaped cap member having outwardly extending protrusions for engaging recesses in the wall of the filler neck of a fuel tank. Although it has a storage compartment for a key, there is shown a hollow cylindrical member threadedly attached at the bottom end of the cap which extends into the filler neck and may contain a key. The cap structure would not allow its use on present day fuel tank filler necks and the placement of the storage compartment into the filler neck would be undesirable.

In this known arrangement, the locking gas cap assembly has a lower portion configured to be removable, received on and closes a container or fuel tank filler neck, an intermediate portion above the lower portion defining an interior storage compartment adapted to contain articles such as keys, money, etc., a cap member rotatably secured above the storage compartment, and a push button combination lock mechanism mounted in the cap member. The locking mechanism has a reciprocating member which will engage the cap member with the intermediate portion upon depressing a correct series of buttons and will disengage the cap member from the intermediate portion when the correct series of buttons are not depressed. When the cap member is disengaged, it rotates freely to prevent removal of the cap assembly from the container and access to the hidden article and the container contents. When the cap member is engaged, the whole fuel tank plug structure can be rotated as a single unit allowing the fuel tank plug structure to be installed or removed from the container or fuel tank filler neck to gain access to the container and the storage compartment of the cap assembly.

But, the cap assembly includes a combination cap lock which may be selectively provided with an interior storage compartment for a key independent of the clogging of the fuel tank filler neck. Herein, it is noted that the clogging of the cap assembly to the filler neck is performed under the cooperation of a fixed plate, a ring having two protrusions and a supporting member integrally assembled into one another, and two recesses formed on the fuel filler neck in a manner which the protrusions are supported in the recesses, respectively. With this arrangement, is easy to fail to seal off the filler neck, and further the laziness of installing the storage compartment to the cap assembly nullifies the storage of an auxiliary key irrelevant to the clogging of the filler neck. As a result, the combination cap lock must be considered to be independent of the interior storage compartment for keys or articles.

SUMMARY OF THE INVENTION

It is therefore an object of the present invention to provide a fuel tank plug structure for closing a container which has an interior openable storage compartment for storing various articles.

It is another object of the present invention to provide a fuel tank plug structure for closing a container which has a combination lock to prevent unauthorized removal from the container.

Another object of the present invention is to provide a fuel tank plug structure for closing a container which has an interior openable storage compartment for storing various articles and a combination lock to prevent unauthorized removal from the container and access to the storage compartment.

Another object of the present invention is to provide a fuel tank plug structure which is configured to be removably, received on, so as to close, a filler neck of a fuel tank or the like which has an interior openable storage compartment for storing various articles and a combination lock to prevent unauthorized removal from the filler neck and access to the storage compartment.

Another object of the present invention is to provide a lockable fuel tank plug structure for closing a container which has a lower portion configured to be removably, received on a container, an intermediate interior storage compartment above the lower portion, and a cap member rotatably secured above the storage compartment.

Another object of the present invention is to provide a lockable fuel tank plug structure for closing a container which has an interior storage compartment and a rotating cap member which can be selectively secured together to be rotated as a single unit so that the fuel tank plug structure can be installed or removed from the container and provide access to the storage compartment, or which may be released such that only the cap member will rotate to prevent removal of the fuel tank plug structure from the container.

Another object of the present invention is to provide a fuel tank plug structure which has a lower portion configured to be removably, received on a filler neck of a fuel tank and which has an interior openable storage compartment for storing various articles, a combination lock to prevent unauthorized removal from the filler neck and access to the storage compartment, and vent arrangement on the lower portion for venting fuel vapors.

A further object of the present invention is to provide a fuel tank plug structure which has a lower portion configured to be removably received on, so as to close, a filler neck of a fuel tank and to provide a plug structure which has an interior openable storage compartment for storing various articles, a combination lock to prevent unauthorized removal from the filler neck and access to the storage compartment, and pressure relief means operatively mounted in the lower portion for relieving pressure in the fuel tank.

A still further object of the present invention is to provide a fuel tank plug structure for closing a container which has an interior openable storage compartment for storing various articles and a combination lock which is simple in construction, economical to manufacture, and is rugged and reliable in use.

A still further object of the present invention is to provide a fuel tank plug structure comprised of a lockable fuel tank plug structure with a clogging assembly.

The above noted objects and other objects of the invention are accomplished by providing a locking fuel tank plug structure including a lockable cap assembly and a clogging assembly, in which the lockable cap assembly has a push button combination lock mechanism mounted in a cap, a fixing plate having a lever and an intermediate portion with an auxiliary key storage chamber, which are operated as one unit to removably fix itself to a filler neck of a fuel tank or other container and the clogging assembly includes a cylindrical body threadedly coupled with the inner portion of the filler neck as well as being inserted into the rear hollow space of the intermediate portion, a supporting portion positioned around the periphery of the cylindrical body to interconnect the cylindrical body to the lockable cap assembly, a gas discharging device installed into the cylindrical body to emit gases at over a predetermined inner pressure of a fuel tank and a sealing member made of rubber to prevent the fuel from leaking during adverse conditions.

The push button combination lock mechanism has a reciprocating member which will engage the cap member with the intermediate portion upon depressing a correct series of buttons and will not disengage the cap member from the intermediate portion when the correct series of buttons are not depressed.

When the cap member is disengaged, it rotates freely to prevent removal of the fuel tank plug structure from the container and access to the hidden article and to the container contents. When the cap member is engaged, the whole fuel tank plug structure can be installed or removed from the container or fuel tank filler neck to gain access to the container and to the storage compartment of the lockable cap assembly. Thus, the present invention assures the sealing off of a fill neck or the like as well as the prevention of the storage compartment from separating from the lockable fuel tank plug structure in order to enable the safe storage of an auxiliary key or other articles in the storage compartment.

These and other objects of the present invention will become more readily apparent from the following detailed description of a preferred embodiment when taken in conjunction with the drawings.

BRIEF DESCRIPTION OF THE DRAWINGS

The present invention will be explained in detail below with reference to the accompanying drawings, in which.

DESCRIPTION OF THE PREFERRED EMBODIMENT

Figure 1:
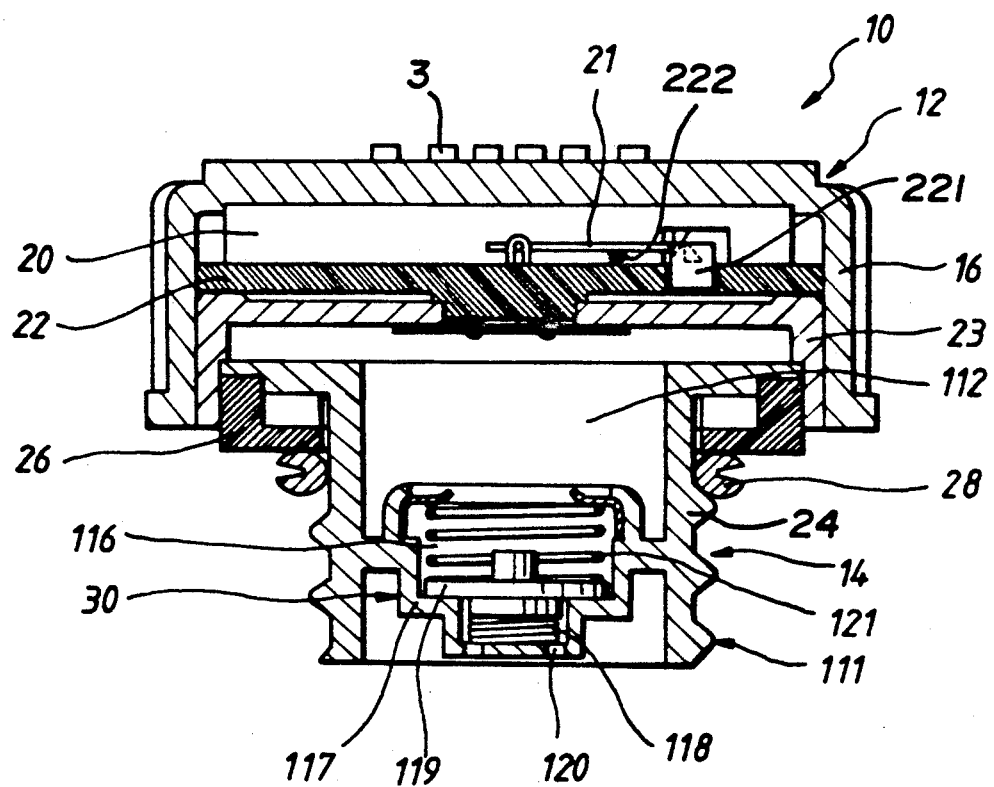
FIG. 1 is a cross-sectional view of a preferred fuel tank plug structure in accordance with the present invention.

Referring to the drawings by numerals of reference, there is shown a preferred locking fuel tank plug structure 10 in accordance with the present invention. It should be understood that the illustrated example of the locking fuel tank plug structure is configured to be received on the filler neck of a fuel tank, but may also be configured to close various other types of containers.

The fuel tank plug structure 10 comprises a lockable cap assembly 12 and a clogging assembly 14 integrated to each other. The lockable cap assembly 12 is provided with a cap member 16, a push button combination lock mechanism 20 mounted in the cap member 16, a fixing plate 22 having a lever 21 and an intermediate member or portion 23 defining an auxiliary key storage chamber. The clogging assembly 14 includes a lower engaging portion 24 adapted to be threadedly coupled with the inner portion of the filler neck as well as being inserted into the rear hollow space of the intermediate portion 23, a supporting portion 26 positioned around the periphery of the lower engaging portion 24, a gas discharging device 30 installed within the lower engaging portion 24 to emit gas at over a predetermined inner pressure of a fuel tank and a sealing member 28 made of rubber to prevent fuel from leaking during adverse conditions.

Figure 2:
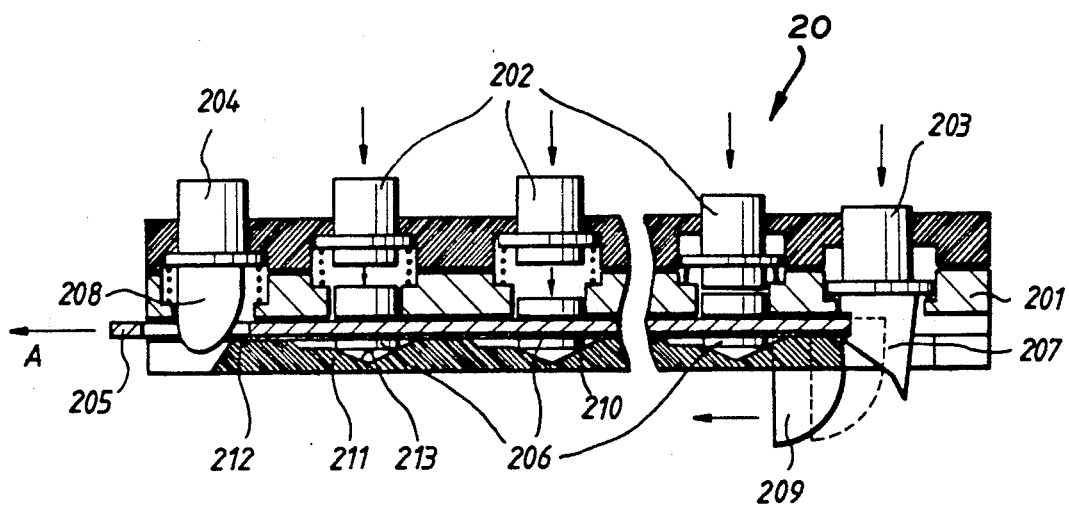
FIGS. 2 and 3 are cross-section views illustrating the operation of a push button combination lock in accordance with the present invention.
Figure 3:
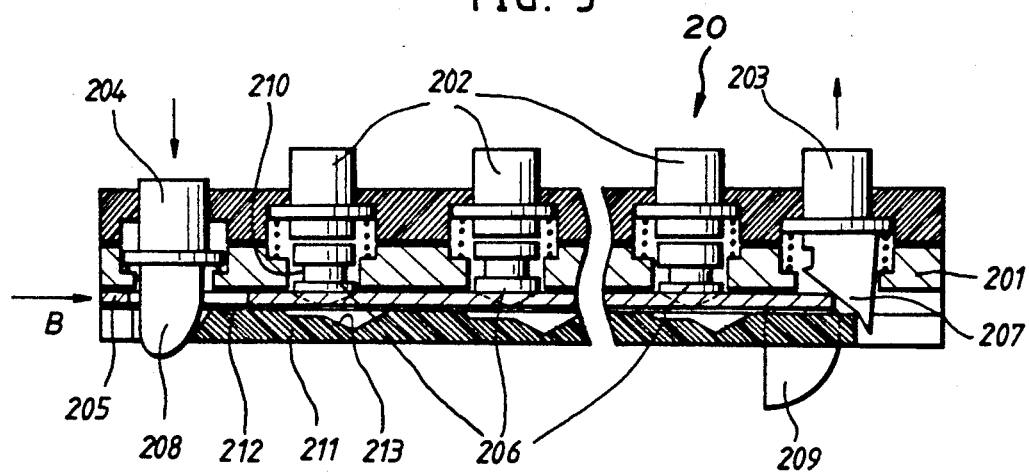

The cap member 16 is partially projected in a box form to receive the push button combination lock 20, on the upper portion of which a series of holes are perforated to project/support a plurality of push buttons 3. These push buttons 3 include a plurality of numbered push buttons 202 and an on-push button 203 and an off-push button 204, respectively, which are elastically supported by means of springs (not labeled) against the combination lock 20 which is positioned in the inner recessed portion of the cap member 16 as seen in FIGS. 2 and 3. The on and off push buttons 203 and 204 have projections 207 and 208 extending through the push button combination lock 20 near both ends, and projections 207 and 208 have one side which is tapered downward.

The push button combination lock 20 as seen in FIG. 2 and FIG. 3 includes a body 201, a slider 205, at least two locking members 206 cooperating with the numbered push buttons 202, respectively and a lower cover 211. The body 201 is drilled in two parallel lines at the upper portion to receive a predetermined number of locking members 206. Also, the body 201 has the same thickness portion as the thickness of the lockable members 206, in the lower portion of which a guide passage 212 is formed to be surrounded with at least three walls to be able to reciprocate the slider 205 according to the operation of the on and off-push buttons 203 and 204. The lockable members 206 each comprise a cylindrical body having a ring groove 210 at a middle portion for slidably receiving slider 205 therethrough, the lower portions of parts of which are sheared below their ring groove to be independent of the sliding operation of the slider 205, and the remaining parts of which retain their original form to block the movement of the slider 205 at the normal position. The slider 205 is formed with extending portion 209 placed on a cut-out portion of the wall adjacent to the on-push button 203, on both sides of which a plurality of slider blocking portions (not shown) are cut in the form of a half-circle to pass over the ring groove 210 of each of the lockable members 206. The lower cover 211 is inserted into the guide rail (not shown) formed on the lower inner surfaces of the side walls of the body 201, on the upper surface of which a series of notches 213 are formed to receive the lockable members 206.

Thus, the push button combination lock 20 is positioned in a normal condition when the off-push button 204 is pushed downward to force the slider 205 to be moved in arrow direction B (FIG. 3). At that time, the blocking portions of the slider 205 retain the corresponding end of the lockable members 206 to prevent the movement of the slider 205 as shown in FIG. 3. On the other hand, when the fuel tank plug structure 10 is adapted to close or open the fuel neck of the container, the numbered push-buttons 202 are selectively depressed downward to get the ring groove 210 positioned to correspond to the lockable portions on both sides of the slider 205, and their ends are respectively positioned in the notches 213 of the lower cover 211. Then, the on-push button is pressed downward to force the slider 205 to be moved in arrow direction A with its extending portion 209 as seen in FIG. 2, thereby fixing/releasing the cap assembly to/from the fuel neck of a container which will be explained below in detail.

Figure 4:
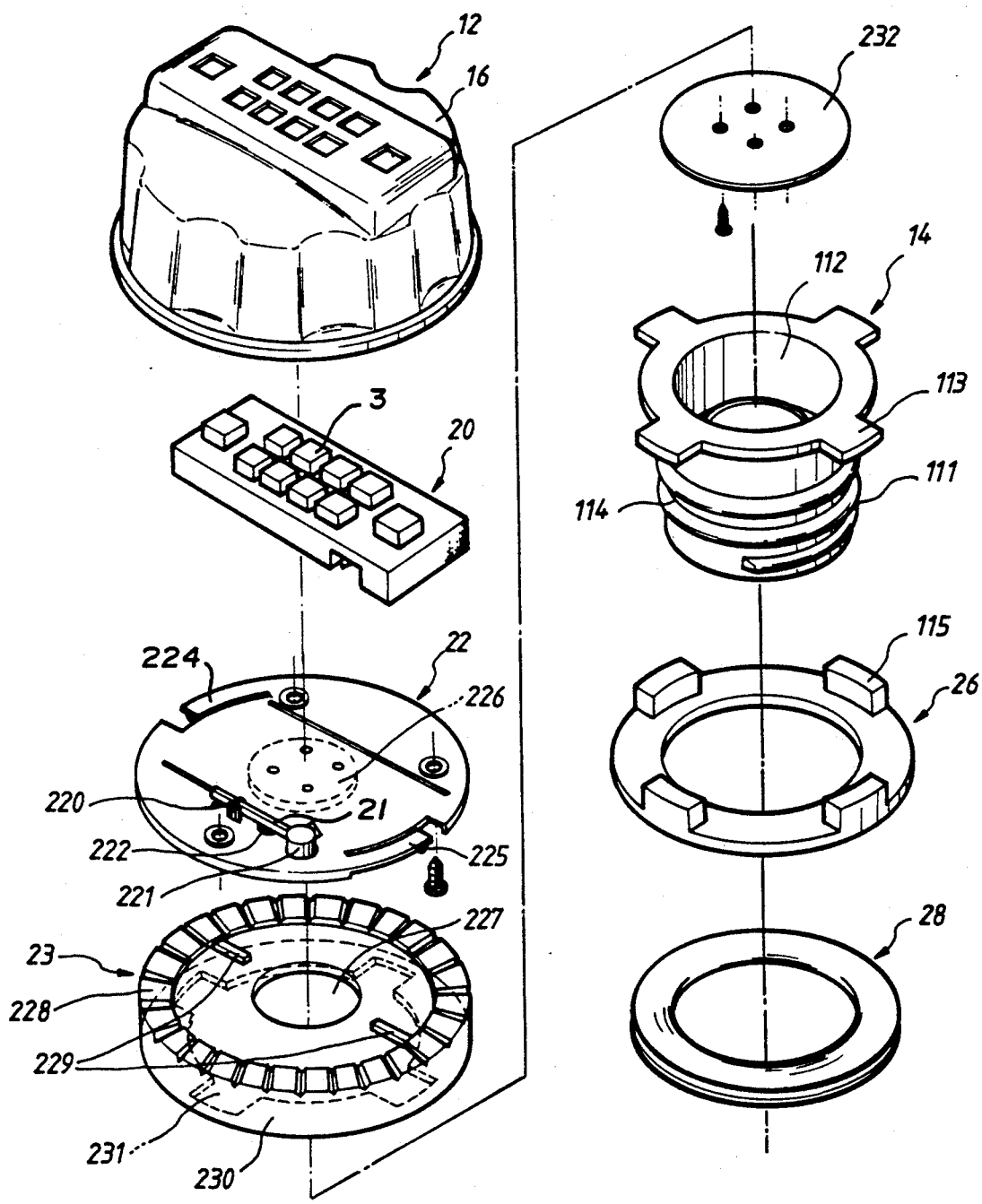
FIG. 4 is an exploded perspective view illustrating the assembly of the fuel tank plug structure in accordance with the present invention.

As best shown in FIG. 4, the fixing plate 22 has a lever 21 fixed on its upper portion. The lever 21 has a pivot point 220 near its one end and a plunger rod 221 extending downward from the remaining end and is elastically supported by means of a spring 222. The plunger rod 221 cooperates with the extending portion 209 of the slider 205 to be projected downward when the numbered push buttons 202 and the on-push buttons 203 are selectively pushed to move the slider 205 leftward in FIG. 2. The fixing plate 22 is slitted, at opposing locations about its periphery to form free end portions 224, each having a contacting point 225. On the lower surface of the fixing plate 22 there is formed a central boss 226 adapted to be fitted into the center hole 227 of intermediate portion 23. Furthermore, the fixing plate 22 is configured to be fixed by means of a plurality of bolts to the cap member 16 with the push button combination lock 20 being contained in the recessed portion of the cap member 16.

The intermediate portion 23 is a storage compartment for keys in the form of a cylindrical body having a hollow space. On the center portion of the intermediate portion 23 there is drilled a hole 227 to receive the thickest portion of the central boss 226, to which the intermediate portion 23 is coupled by means of a separate plate 232 and screws with the fixing plate 22. The intermediate portion 23 is provided with a toothed portion 228 formed around the periphery of its upper surface to contact with the contacting points 225 and two stoppers 229 built up diametrically on opposite sides near the toothed portion 228 which cooperate with the plunger rod 221 of the lever 21, while a plurality of flanges 230 are formed extending in a predetermined interval from around its lower periphery in a paired arrangement opposite each other.

The clogging assembly 14 has a neck engaging lower portion 111 having a depending generally tubular portion 112 with a radial flange 113 at its upper end. The exterior of the tubular portion 112 is provided with threads 114 configured to be received on the object to which it is to be attached, such as the filler neck of a fuel tank. The supporting portion 26 has a plurality of shoulders 115 inserted into slots 231 between the flanges 230 of the intermediate portion 23 while being mounted about the exterior of the tubular portion 112. The seal member 28 may also be installed on the exterior of the tubular portion 112 beneath the flange 113 to sealingly engage the top surface of the filler neck or container when the cap assembly is threadedly received thereon. A central bore 116 extends downward from the upper end of the tubular portion 112 and terminates in a bottom wall 117. The upper portion of the bore 116 has a counterbore 118 and a circular plate member 119 is installed therein.

In some applications, such as vehicle fuel tanks, it may be desirable to provide the cap lower portion 111 with a means for venting fuel vapors for relieving pressure in the container or tank. In this gas discharging device 30, the bottom wall 117 may be provided with one or more axially extending vent openings 120. The plate 119 may also be provided with vent openings (not shown). The lower portion or bottom wall 117 of the lower portion 111 may also be configured to cooperatively receive a conventional pressure relief valve in which case the counterbore 118 in the upper portion of the bore 116 may be used to accommodate a plate against which a valve spring member 121 may be biased (see FIG. 1).

The details of a pressure relief valve are not shown in the drawings, since they are conventional in the art and a variety of designs are commercially available. It should be understood that the fuel tank plug structure of the present invention may be configured such that conventional relief valve mechanisms may be housed within the lower portion 111 depending upon the particular application.

Therefore, the intermediate portion 23 is rotatably mounted above the clogging assembly 14. That is to say, the radical flanges 113 of the tubular portion 112 are inserted into the slots 231 and somewhat rotated to be engaged with the flanges 230. Then, the shoulder 115 of the supporting portion 26 is fitted into the slots 231 to be supported against the sealing member 28.

As a result, a locking mechanism comprising a push button combination lock 20 having a body 201, which is secured in the recessed portion of a cap member 16, a fixing plate 22, an intermediate portion 23 and a clogging assembly 14 is formed.

When no buttons 3 are depressed or when the incorrect series of buttons are depressed, the extending portion 209 remains in the retracted position. In this position, the plunger rod 221 is not engaged with any one of stoppers 229 to force the fixing plate 22 to be slipped over the toothed portion of the intermediate portion 23 when cap member 16 is rotated. In this condition, fuel tank plug structure 10 can not be rotated as a single unit allowing users to gain access to the intermediate portion 23 for containing keys.

When the correct series of buttons 3 are depressed, the extending portion 209 is shifted to force the plunger rod 221, engaged with the extending portion 209 of a slider 205, to be pushed downward, so that the plunger rod 221 is engaged with one of the stoppers 229. Therefore, during the rotation of cap member 16, the fixing plate 22 forces the intermediate portion 23 to rotate therewith, so that the clogging assembly 14 can be removed from the fuel neck. In other words, when the cap member 16 rotates the lower engaging portion 111 of tubular portion 112, the fuel tank plug structure 10 can be released as a single unit from the fuel neck or the container, while supporting portion 26 and sealing member 28 can be disengaged from the intermediate portion 23 to allow users to have keys held therein.

While this invention has been described fully and completely with special emphasis upon a preferred embodiment, it should be understood that within the scope of the appended claims the invention may be practiced otherwise than as specifically described herein.

We claim:

1. A fuel tank plug structure for closing a container and for storing an article in a compartment thereof comprising:

a cap assembly including a cap member having an inner surface and a recessed portion, a push button combination lock mounted in said recessed portion for selectively locking the cap assembly onto a container when a combination other than a predetermined combination is in place and permitting release of the cap assembly when the predetermined combination is in place, a fixing plate mounted upon the inner surface of the cap member to secure said push button combination lock in said recessed portion and an intermediate member positioned below said fixing plate, said fixing plate including a lever movably mounted thereon and a hole extending therethrough, said lever including a plunger member adapted to extend through said hole when said lever is moved relative to said fixing plate in a predetermined direction, said intermediate member including at least one stopper member adapted to be engaged by said plunger member when said plunger member extends through said hole and an interior compartment formed therein which is adapted to store an article, said push button combination lock including means for causing said plunger member to extend through said hole and engage said stopper member when said predetermined combination is in place such that rotation of said cap member will cause rotation of said intermediate member, and to disengage said plunger member from said stopper member when said predetermined combination is not in place such that said cap member can rotate relative to said intermediate member; and a clogging assembly removably secured to said cap assembly so as to rotate with said intermediate member and to selectively close or provide access to said interior compartment, said clogging assembly including a lower portion adapted to engage and close a container.

2. The fuel tank plug structure as claimed in claim 1, in which:

the fixing plate has a central boss, and the intermediate member has a hole receiving the central boss to attach said intermediate member to the fixing plate by means of a separate plate.

3. The fuel tank plug structure as claimed in claim 1, in which:

the intermediate member includes a side wall and a top wall defining said interior compartment.

4. The fuel tank plug structure as claimed in claim 1, in which:

the clogging assembly includes a tubular portion with a plurality of radial flanges at an upper end thereof and a supporting portion for fixedly connecting the tubular portion to the intermediate member by means of a sealing member.

5. The fuel tank plug structure as claimed in claim 4, in which:

the sealing member is mounted about an exterior portion of said tubular portion beneath the radial flanges, said sealing member being adapted to sealingly engage a surface of a container when the fuel tank plug structure is received thereon.

6. The fuel tank plug structure as claimed in claim 4, in which:

the tubular portion has a central bore extending downward from an upper end thereof which terminates in a bottom wall.

7. The fuel tank plug structure as claimed in claim 6, in which:

the tubular portion includes a gas discharging means in the bottom wall.

* * * * *